Z. C. ROBBINS.
Rotary Churn.
No. 159. Reissued Jan. 1, 1850.
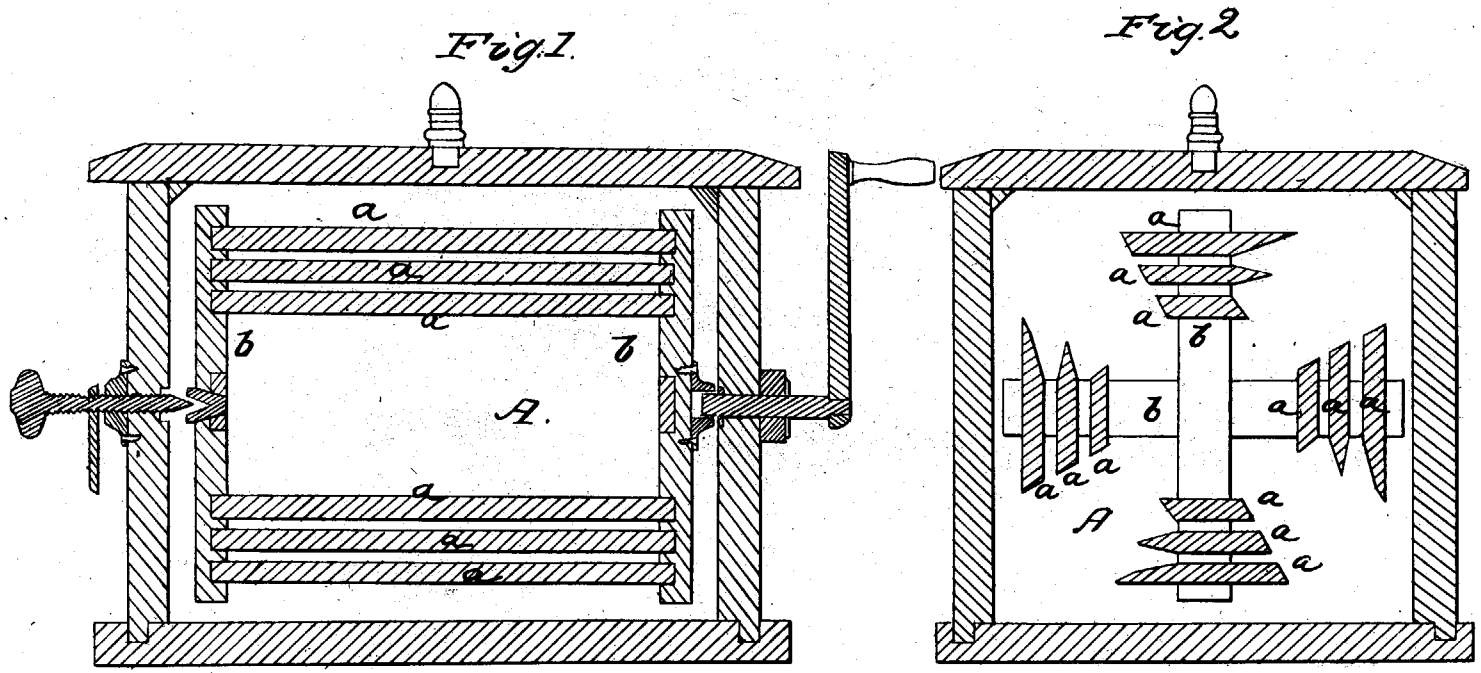
N. PETERS, Photo-Lithographer, Washington, D. C.

UNITED STATES PATENT OFFICE.

Z. C. ROBBINS, OF ST. LOUIS, MISSOURI.

IMPROVEMENT IN CHURNS.

Specification forming part of Letters Patent No. 6,556, dated June 1, 1849; Reissue No. 159, dated January 1, 1850.

*To all whom it may concern:*

Be it known that I, Z. C. ROBBINS, of the city and county of St. Louis, in the State of Missouri, have invented a new and Improved Churn, to be known as the Telegraph-Churn; and I do hereby declare the following to be a full, clear, and exact description thereof, reference being had to the accompanying drawings, making a part of this specification, in which—

Figure 1 is a longitudinal vertical section, and Fig. 2 a vertical transverse section.

Similar letters indicate like parts in both figures.

The nature of my invention consists in giving such a form to a rotating agitator that the beaters placed upon it will cut through the milk or cream edgewise, and by their broad parallel or converging surfaces raise a portion of the cream at each revolution up into the air in the upper part of the churn, and thereby separate the particles thereof, for it will readily be perceived that two broad parallel or converging surfaces placed tangential to their circle of rotation will raise a body of liquid filling nearly their whole space and gradually distribute it above, while the outer surface will prevent its flying off, by which means I am enabled to get a greater amount of agitation, and distribute the milk or cream through the air more perfectly than in any other way by which it can be accomplished, the agitator performing by its rotation an operation upon milk or cream similar to that produced by knives upon the whites of eggs during the process of what is called "whipping them up." I produce this effect by forming the beaters on the agitator of thin slats or boards *a a*, secured to radial arms *b b* or disks in such positions as to bring their sides at right angles, or nearly so, with the radii of the agitator.

I generally construct the agitator of four series of beaters, as represented in the drawings, each series being composed of two, three, or more beaters—one placed within the other—with narrow spaces between each beater. I generally have the beaters of each series diminish in width from the outermost to the inner one, so as to bring their edges into radial lines from the axis of the agitator and their rear edges within said line for the purpose of gathering the butter. The front edges of the beaters are beveled off nearly or quite to sharp edges. Their rear edges are blunt, and on a line with each other. When the agitator is rotated in milk or cream placed in the churn-box, the sharp edges of the beaters cut into and divide the particles and gather the milk or cream between their converging surfaces, and as the beaters ascend they carry up quantities of milk or cream in the spaces between them, which is discharged in thin curved sheets at their rear edges in the atmosphere in the upper part of the churn in such quantities as to completely envelop the agitator, producing thereby a complete agitation of the whole body of the milk or cream and a mingling of the minutely-separated particles of cream with the atmosphere in the upper portion of the churn-box.

It is found in practice that this form of agitator does not throw off particles of milk or cream tangentially unless it is turned at an unnecessarily high velocity, and consequently it can be operated in an uncovered box to give the milk or cream the greatest possible benefit of atmospheric influences. As the agitator does not by its action put the whole body of milk or cream in a rotary motion, it can be operated in a round vessel with as much efficiency as in a square one. Butter has been produced from milk at the usual churning-temperature with this churn in two minutes, and at a little higher temperature in less than two minutes.

I do not intend to limit myself to the particular number of proportions of the parts of which the agitator is composed; nor to the uses to which it may be applied, nor shall I limit myself to the use of any particular description of material in constructing the agitator. After the butter has been produced by the forward action of my improved agitator, by reversing its motion the butter will all be collected into a roll in the center of the agitator by the action of the thick inclined rear edges of the beaters.

What I claim as my invention, and desire to secure by Letters Patent, is—

The series of parallel floats or beaters *a a*, formed and arranged within the agitator, substantially as above described, so that when their motion is reversed their thick inclined rear edges will gather the butter into a roll in the center of the agitator, substantially as herein set forth.

Z. C. ROBBINS.

Witnesses:
R. W. WILCOX,
WM. GREENOUGH.